United States Patent
Sulfstede

(10) Patent No.: US 6,826,454 B2
(45) Date of Patent: Nov. 30, 2004

(54) AIR CONDITIONING DIAGNOSTIC ANALYZER

(76) Inventor: Louis E. Sulfstede, 2906 Waterford Dr., Irving, TX (US) 75063

( * ) Notice: Subject to any disclaimer, the term of this patent is extended or adjusted under 35 U.S.C. 154(b) by 287 days.

(21) Appl. No.: 09/955,659

(22) Filed: Sep. 19, 2001

(65) Prior Publication Data

US 2003/0060933 A1 Mar. 27, 2003

(51) Int. Cl.$^7$ .................. G01M 1/38; G05B 13/00; G05B 15/00; G06F 11/30; G21C 17/00
(52) U.S. Cl. ........................ 700/276; 702/183
(58) Field of Search ............... 700/276, 278, 700/299, 300; 702/182, 183, 185; 236/51

(56) References Cited

U.S. PATENT DOCUMENTS

| | | | | |
|---|---|---|---|---|
| 4,146,085 A | * | 3/1979 | Wills ........................ 165/11.1 |
| 4,381,549 A | * | 4/1983 | Stamp et al. ................ 62/126 |
| 4,538,419 A | * | 9/1985 | Lord ........................... 62/129 |
| 5,311,451 A | | 5/1994 | Barrett ...................... 364/550 |
| 5,446,677 A | | 8/1995 | Jensen et al. ............... 364/510 |
| 5,463,559 A | * | 10/1995 | Kirkpatrick et al. ......... 702/58 |
| 5,493,868 A | * | 2/1996 | Kikuiri et al. ................ 62/129 |
| 5,555,195 A | | 9/1996 | Jensen et al. .......... 364/551.01 |
| 5,555,509 A | | 9/1996 | Dolan et al. ................ 364/505 |
| 5,581,478 A | | 12/1996 | Cruse et al. ................ 364/505 |
| 5,596,507 A | | 1/1997 | Jones et al. ................. 364/505 |
| 5,682,329 A | | 10/1997 | Seem et al. ............ 364/551.01 |
| 5,816,059 A | * | 10/1998 | Ficchi et al. ................. 62/127 |
| 5,892,690 A | | 4/1999 | Boatman et al. ....... 364/528.11 |
| 6,179,214 B1 | * | 1/2001 | Key et al. ..................... 236/51 |
| 6,324,854 B1 | * | 12/2001 | Jayanth ....................... 62/127 |
| 2001/0045097 A1 | * | 11/2001 | Pham et al. .................. 62/132 |
| 2002/0040280 A1 | * | 4/2002 | Morgan ...................... 702/114 |

* cited by examiner

Primary Examiner—Albert Paladini
Assistant Examiner—Ryan A. Jarrett
(74) Attorney, Agent, or Firm—Michael L. Diaz

(57) ABSTRACT

A diagnostic apparatus for analyzing a motor of a heating, ventilation, and air conditioning (HVAC) system. The diagnostic apparatus includes a portable control unit which is detachably coupled to the HVAC system. The control unit can monitor, generate and simulate all control functions associated with the HVAC system.

19 Claims, 6 Drawing Sheets

AIR CONDITIONING DIAGNOSTIC ANALYZER

BACKGROUND OF THE INVENTION

1. Technical Field of the Invention

This invention relates to diagnostic devices, and more particularly, to a diagnostic apparatus that analyzes problems associated with air conditioning systems.

2. Description of Related Art

Heating, ventilation, and air conditioning (HVAC) systems are an important part of any modern residential or commercial building. As HVAC systems increase in complexity and capabilities, problems and servicing of these systems have also increased. It is quite common for a technician servicing or repairing an HVAC system to spend many hours in servicing and repairing the system. Currently, most controls associated with an HVAC system are located away from the main components of the HVAC system, such as the motor and blower units. When a technician is servicing an HVAC system, in order to troubleshoot or diagnose problems of the system, he must operate the HVAC in its various modes. However, since many control units are located away from the motor, the technician must travel between the two locations. In addition, to complicate matters, the technician normally does not have any portable instrumentation to determine if the connections between the control unit and the other HVAC system components are operating correctly. Furthermore, there are no available tools for comprehensive and process-oriented troubleshooting of the new electronically-driven motors prevalent in the HVAC market. A portable device is needed which enables a technician to control the HVAC system from a location adjacent the main HVAC system components and provides a plurality of diagnostic instrumentation to assist the technician in determining the problems associated with the HVAC system.

Although there are no known prior art teachings of a solution to the aforementioned deficiency and shortcoming such as that disclosed herein, prior art references that discuss subject matter that bears some relation to matters discussed herein are U.S. Pat. No. 5,682,329 to Seem et al. (Seem), U.S. Pat. No. 5,446,677 to Jensen et al. (Jensen), U.S. Pat. No. 5,892,690 to Boatman et al. (Boatman), and U.S. Pat. No. 5,555,509 to Dolan et al. (Dolan).

Seem discloses a diagnostic system for use in a network control system. The diagnostic system is used to analyze HVAC system or variable air volume (VAV) box performance in an environmental control system. The diagnostic system records temperature, air flow, and actuator position data in the controller associated with the VAV box and calculates an exponentially weighted moving average value. However, Seem does not teach or suggest providing an alternate control unit for control parameters within the environmental unit. Seem merely discloses monitoring the environmental unit without providing any control or troubleshooting capability.

Jensen also discloses a diagnostic system for use in a network control system. The diagnostic system is used to analyze VAV box performance in an environmental control system. The system allows a technician to perform diagnostic tests on VAV boxes from a remote location. The diagnostic system also formats the air flow so that it can be displayed as a graphical representation. However, Jensen does not teach or suggest controlling a plurality of control modes and functions separately from the internal environmental control unit. Jensen merely discloses limited control functions of actuators of a damper system of the VAV box.

Boatman discloses an environmental monitoring system and method for systematically and continuously monitoring an environment. The system and method includes a data acquisition system which is programmed to systematically collect environmental data for a site. The data acquisition system includes sensors coupled to a data storage device having a remote access device. Data may then be uploaded to the remote database for storing environment data from many sites. The remote database utilizes the remote access device so that the data storage devices of various data acquisition sites can be electronically coupled to the remote database for centralized data collection and storage. However, Boatman does not teach or suggest a system for remotely controlling a plurality of control modes and functions of the environmental unit. Rather, Boatman merely discloses monitoring a plurality of parameters within the environmental unit and storing the data in a remote location.

Dolan discloses a device for reading and transmitting control parameter selections to a control system for an HVAC system. The device reads and encodes all control parameter selections in a predefined manner in response to the control system. The device includes a programmed microprocessor that begins its regaining of control parameter selections from a beginning point in a software program. The microprocessor includes a switchable power supply which is periodically switched on and off by the control system that will be receiving and responding to the control parameter selections. However, Dolan does not teach or suggest providing control inputs to the HVAC system or a means for troubleshooting or diagnosing problems with the HVAC.

Review of the foregoing references reveals no disclosure or suggestion of an apparatus as that described and claimed herein. Thus, it would be a distinct advantage to have a portable device which provides remote control inputs to an HVAC system and the capability to troubleshoot and diagnose problems associated with the HVAC system. It is an object of the present invention to provide such an apparatus.

SUMMARY OF THE INVENTION

In one aspect, the present invention is a diagnostic apparatus for examining a heating, ventilation, and air conditioning (HVAC) system. The apparatus includes a control unit connected to the HVAC system for controlling a plurality of control parameters of the HVAC system. The apparatus also monitors a plurality of performance characteristics of the HVAC system. The control unit controls the plurality of control parameters and monitors the plurality of performance characteristics to provide a diagnostic check of the HVAC system.

In another aspect, the present invention is an apparatus for examining a heating, ventilation, and air conditioning (HVAC) system. The apparatus includes a portable control unit detachably coupled to the HVAC system. The control unit monitors a plurality of performance characteristics associated with a plurality of control parameters controlling the HVAC system. The control unit also controls the HVAC system through the plurality of control parameters of the HVAC system. The control unit monitors the plurality of performance characteristics while controlling the HVAC system to determine a status of the HVAC system.

In still another aspect, the present invention is a diagnostic apparatus for examining a heating, ventilation, and air conditioning (HVAC) system. The apparatus includes a control unit connected to the HVAC system. The control unit controls a plurality of control parameters of the HVAC system through a plurality of control function activators providing control functions to the HVAC system. The control unit also variably controls at least one control parameter and monitors a plurality of performance characteristics of the HVAC system. The control unit controls the plurality of control parameters and monitors the plurality of performance characteristics to perform a diagnostic check of the HVAC system.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
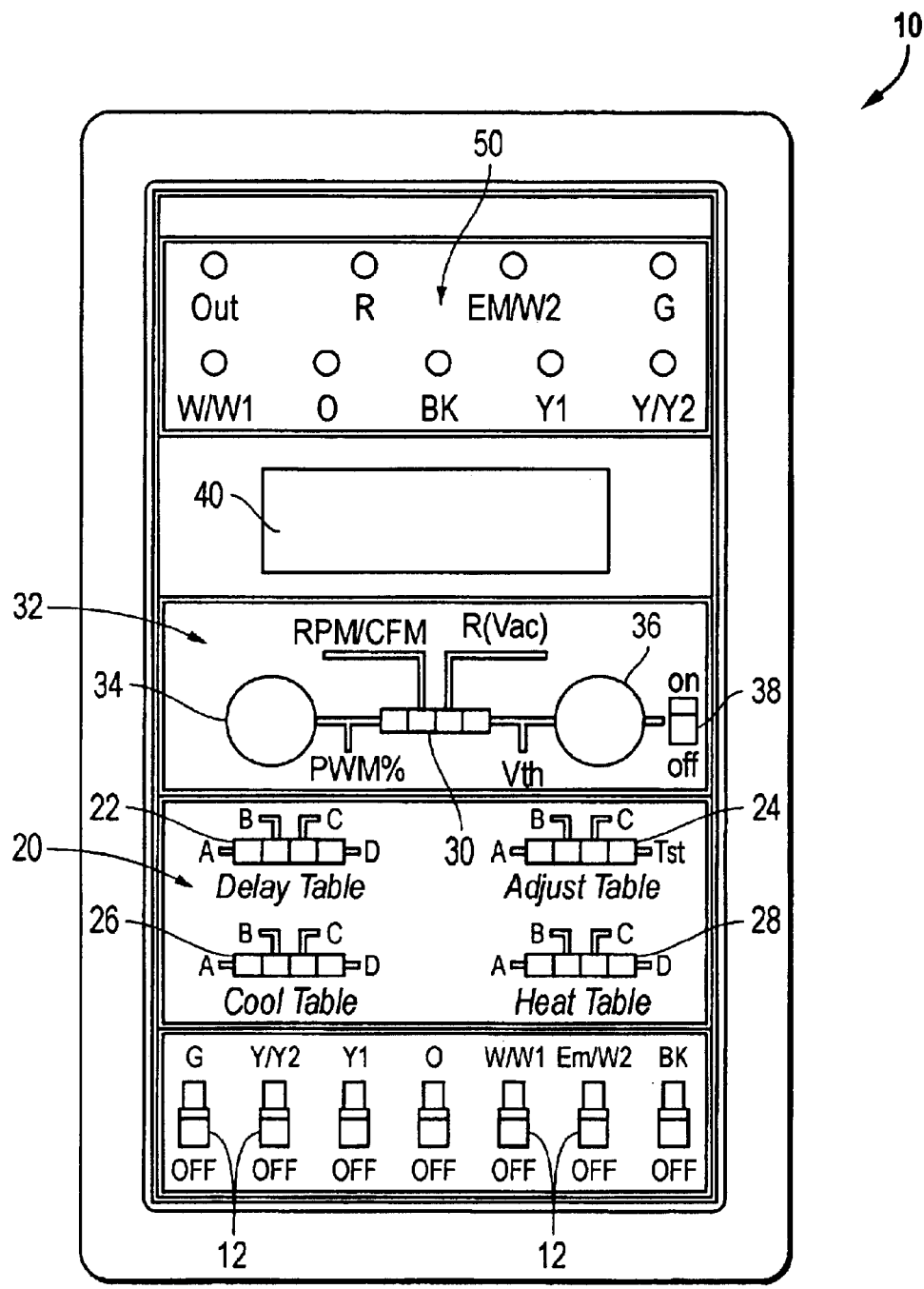
FIG. 1 is a front view of an analyzer in the preferred embodiment of the present invention.

A diagnostic device for analyzing and troubleshooting an HVAC system is disclosed. FIG. 1 is a front view of an analyzer 10 in the preferred embodiment of the present invention. The analyzer preferably includes a plurality of control function activators 12. Each of these activators may activate an HVAC system's motor through low voltage interfaces. The activators may be utilized to control a plurality of the motor's control line inputs. For example, the activators may include the following control inputs shown below in Table 1.

TABLE 1

Control Function Activators

| Control Function Activator | Control Line Input |
|---|---|
| G | FAN ONLY |
| Y/Y2 | Compressor ($2^{nd}$ stage compressor in 2 stage systems) |
| Y1 | $1^{st}$ stage compressor (in 2 stage systems |
| O | Changeover valve (heat pumps) |
| W/W1 | $1^{st}$ stage heating |
| Eht/W2 | Emergency heat (heat pumps) or $2^{nd}$ stage heat |
| Bk/PWM | Activates to dehumidify airflow (BK/PWM). Also may activate PWM in continuously variable systems |

It should be understood that the above control function activators are merely exemplary. Any functions which are associated with control of a motor within an HVAC system may be used as a control function activator 12.

Still referring to FIG. 1, located above the plurality of control function activators 12 are the table value selectors 20. The table value selectors are four 4-position switches used to select one of four table elements from each of the four tables typically programed into an electronically-driven motor of an HVAC system. In most cases, these tables are accessed through a "tap" or "interface" board, that is part of or an accessory to the HVAC equipment, to select capacity, trim, delay, or airflow of the system. As illustrated, the terms Delay Table 22, Adjust Table 24, Cool Table 26, and Heat Table 28 are illustrated. However, the labels may vary, depending on the manufacturer's nomenclature. Preferably, each manufacturer's nomenclature may be utilized by overlaying a manufacturer specific label for each system undergoing service or being monitored.

Above the table value selectors 20 is the display mode switch 30. The display mode switch controls display parameters associated with a display 40. In the preferred embodiment of the present invention, four selections may be made. In the first selection, "Vth" displays the adjustable AC voltage used to measure and test the on/off threshold of the G and Y functions. In the second selection, "Vac" displays the system control transformer's supply voltage (normally, 18 Vac minimum to 30 Vac maximum, however the Vac display selection may show any voltage range). In the third selection, "PWM" turns on the control signal generator (specific to some HVAC systems) and displays the controlling duty cycle of that signal as a percentage ranging from 1.4% to 99.6%. The duty cycle displayed is selected from the source selected by a control mode selector 70 to be discussed below. Both internally and externally generated duty cycles may preferably be measured to within 0.2% duty cycle. In the fourth selection, "RPM" displays RPM of the motor (if available from the auxiliary output for the motor). In alternate embodiments of the present invention, the analyzer 10 may use any type of display controls and parameters to determine the type of display shown on the display 40. The analyzer may include two variable control knobs 32 such as a PWM Adjust control 34 and a Vth control 36. The control knobs may provide variable control of several system functions. The PWM Adjust control 34 provides an internal, adjustable duty cycle signal for testing systems using the continuously variable mode of the motor. Preferably, duty cycle adjustments can be made in 0.4% increments from 1.4% to 99.6%. However, these ranges and increments are exemplary and alternate embodiments of the present invention may utilize different functions, increments and ranges. The percentage PWM displayed in display 40 is the percent duty cycle from the source selected by the control mode selector 70.

Vth control 36 tests the "anticipator" thresholds of the G, Y/Y2, and Y1 functions. The Vth control adjusts the amplitude of an internally generated variable amplitude sine wave voltage which can be supplied to the motor through the G and Y control function activators 12. A switch 38, adjacent the Vth control, is used to select either the variable voltage level from the Vth generator (Vth On) or the fixed voltage level from the low voltage transformer (Vth off). Specifically, the switch activates the Vth signal. Thus, when the "off" position is selected, the switch passes the fixed low voltage (normally 24-Vac) to the motor.

The display 40 may be any type of display which provides graphical representations from the parameters selected by the display mode switch 30. However, in the preferred embodiment of the present invention, the display is a liquid crystal display.

Located above the display 40 are the control function status lamps 50. The lamps include a plurality of lights (preferably LEDs) representing the integrity of the motor connections. As illustrated, eight control functions of the motor (R, EM/W2, G, W/W1, O, BK, Y1, and Y/Y2) and an auxiliary output (OUT) are shown. In the preferred embodiment of the present invention, the lights illuminate only when a connection to the input terminals of the motor and current is properly flowing through the interface. However, other visual signals may be established to display the status of various connections associated with the motor. For example, a light may illuminate when the connection is not operating correctly.

Figure 2:
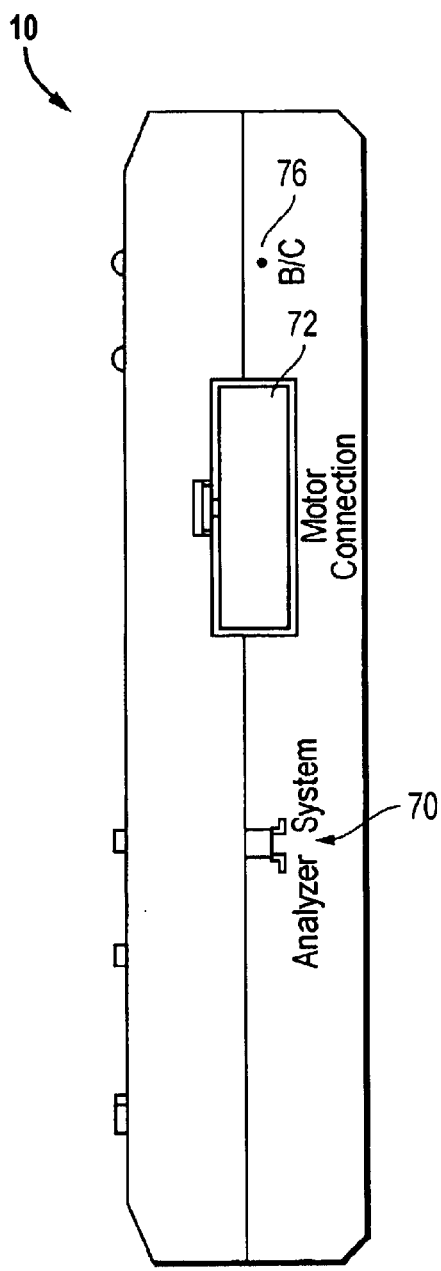
FIG. 2 is a right side view of the analyzer of FIG. 1 in the preferred embodiment of the present invention.

FIG. 2 is a right side view of the analyzer of FIG. 1 in the preferred embodiment of the present invention. The analyzer includes the control mode selector 70. The operator may select either "System" or "Analyzer" to select a desired control mode. In the "Analyzer" mode, the analyzer generates and supplies command signals necessary to activate the HVAC system's motor. On the other hand, the "System" selection monitors the control signals generated by the HVAC's control system to the motor so that the system's operation can be assessed and faults diagnosed. The "System" mode provides for an in-line mode. In this in-line mode, the analyzer 10 operates while the system is operating, monitoring the system's status and verifying the continuity of the control functions. In addition, a power pin-jack connection 76 (labeled "B/C") is also provided.

The second mode, "Analyzer" is used for the "Stand-Alone" control mode of operation, which independently exercises the motor with or without any connection with the system (with the exception of a low voltage power source) such as a 24-Vac power. By providing a dual mode operation of the motor (i.e., operating the motor either from the system or through an independent signal source generated in the analyzer while the system is intact), provides a technician powerful diagnostic troubleshooting capabilities.

Still referring to FIG. 2, the analyzer 10 includes a motor cable port 72 which provides a receptacle port for a cable to be connected between the analyzer and the motor.

Figure 3:
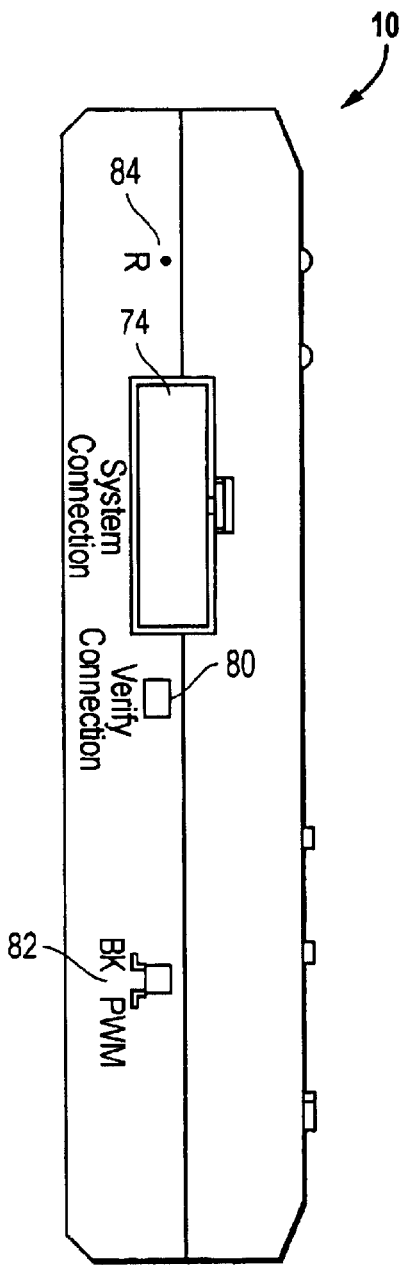
FIG. 3 is a left side view of the analyzer of FIG. 1 in the preferred embodiment of the present invention.

FIG. 3 is a left side view of the analyzer 10 of FIG. 1 in the preferred embodiment of the present invention. The analyzer includes a control system cable port 74 which allows a cable to be connected from the analyzer to the control system. The motor cable port 72 and the control system cable port 74 permit the analyzer to be inserted electrically between the HVAC controls and the Motor in the "In-Line" mode of operation. The in-line mode operates while the motor is installed in the application and powered by the system. The connection to the HVAC system permits the rapid and conclusive diagnosis of the wiring, hookup errors, motor faults, etc.

Figure 8:
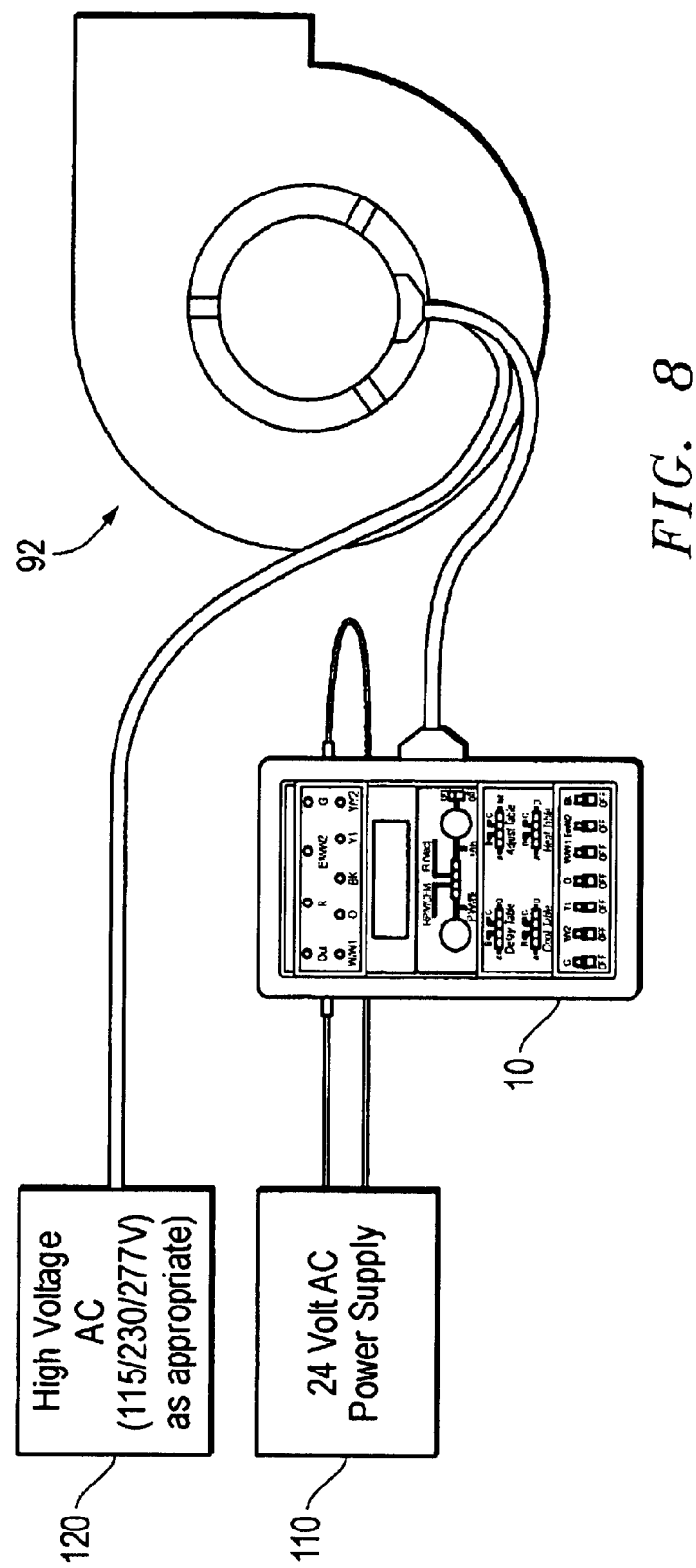
FIG. 8 is a simplified schematic block diagram of the analyzer of FIG. 7 connected to the motor.

The analyzer may also be operated in a "standalone" configuration in which only connections from the right side of the analyzer (FIG. 2) to the motor may be made (FIG. 8). In addition, a second power pin-jack connection 84 (labeled "R") is also located on the analyzer. The pin-jack connections enable the analyzer to be used in the "standalone" mode.

In addition, the analyzer may include a verify commons switch 80. The switch is used to troubleshoot the connection between the two commons required by the motor. Actuating the "Verify Commons" on the switch 80 forces a connection between the two commons between two electrical common connections (typically required in most common electronically-driven motors used in HVAC systems). The "verify commons" may be helpful in determining whether the commons are properly connected in the system. The analyzer also includes a BK/PWM switch 82 for selecting either a variable duty cycle PWM signal or a low voltage 24-Vac signal. BK connects the selected signal to the motor. This signal or its equivalent are also a functional feature most common electronically-driven HVAC blower motors in use today.

Figure 4:
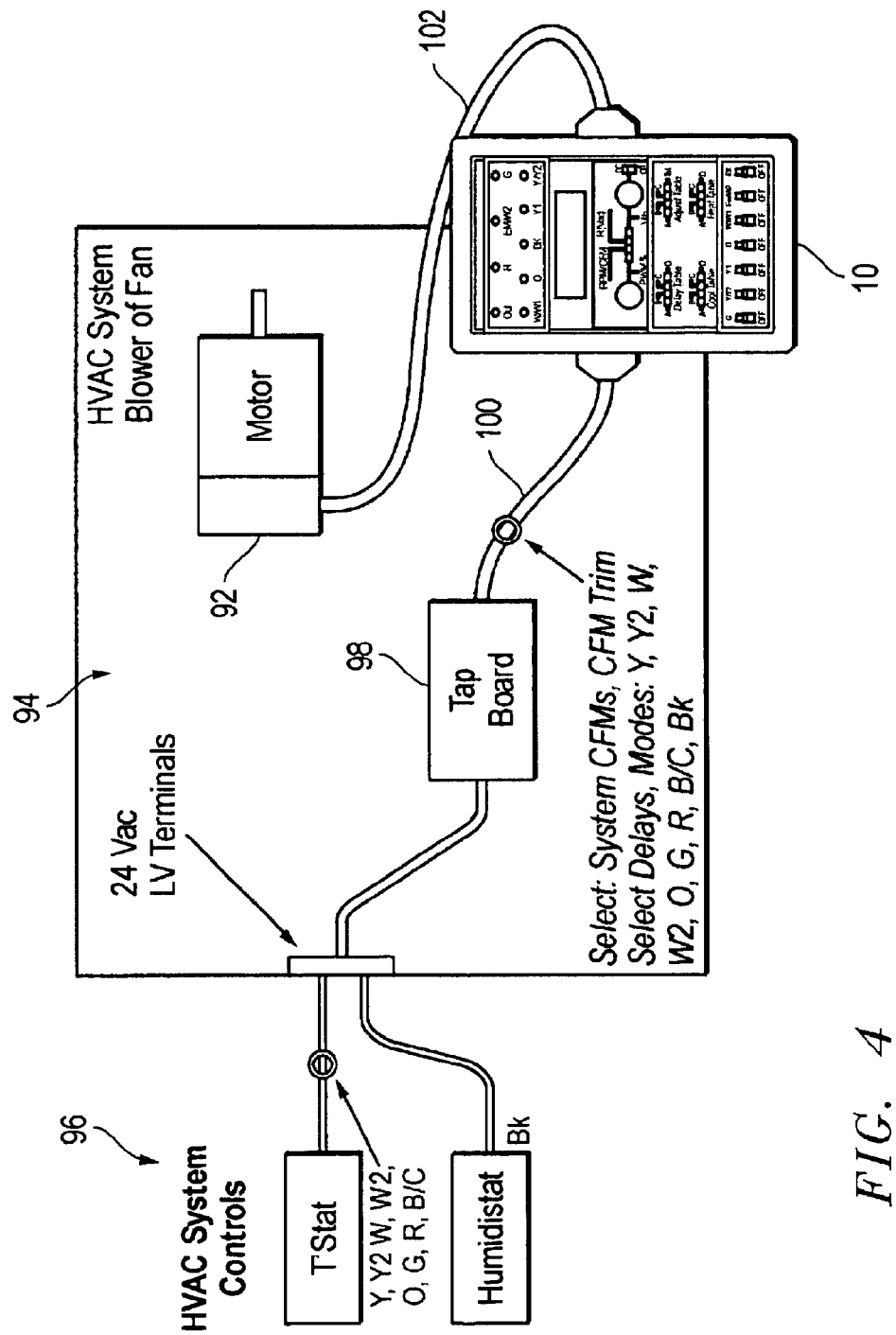
FIG. 4 is a simplified schematic block diagram of the analyzer attached to an air conditioning system in the preferred embodiment of the present invention.

FIG. 4 is a simplified schematic block diagram of the analyzer 10 attached to an air conditioning system 90 in the preferred embodiment of the present invention. The air conditioning system may be any HVAC system. The analyzer 10 specifically interfaces to the system 20 driven by a motor 92. The motor is normally activated through low voltage (generally 24Vac nominal) connections. The motor drives a blower 94. The motor may be any motor but, in the preferred embodiment of the present invention, is a brushless dc motor. The air conditioning system also includes an HVAC control system 96 and a tap board 98. The analyzer is installed between a connection running from the tap board to the motor.

The analyzer is attached within the air conditioning system by removing the connection between the motor and tap board. A tap board cable 100 is attached from the tap board to the control system cable port 74 of the analyzer 10. In addition, another motor cable 102 is attached from the motor 92 to the motor cable port 72 of the analyzer.

Figure 5:
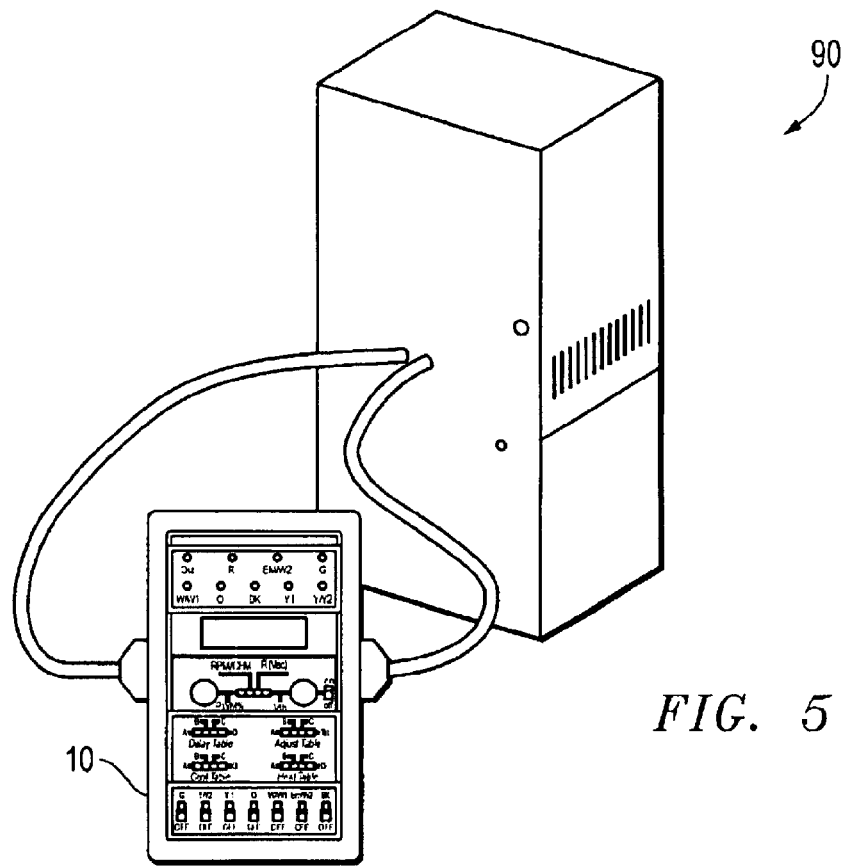
FIG. 5 is a front perspective view of the analyzer attached to the air conditioning system.
Figure 6:
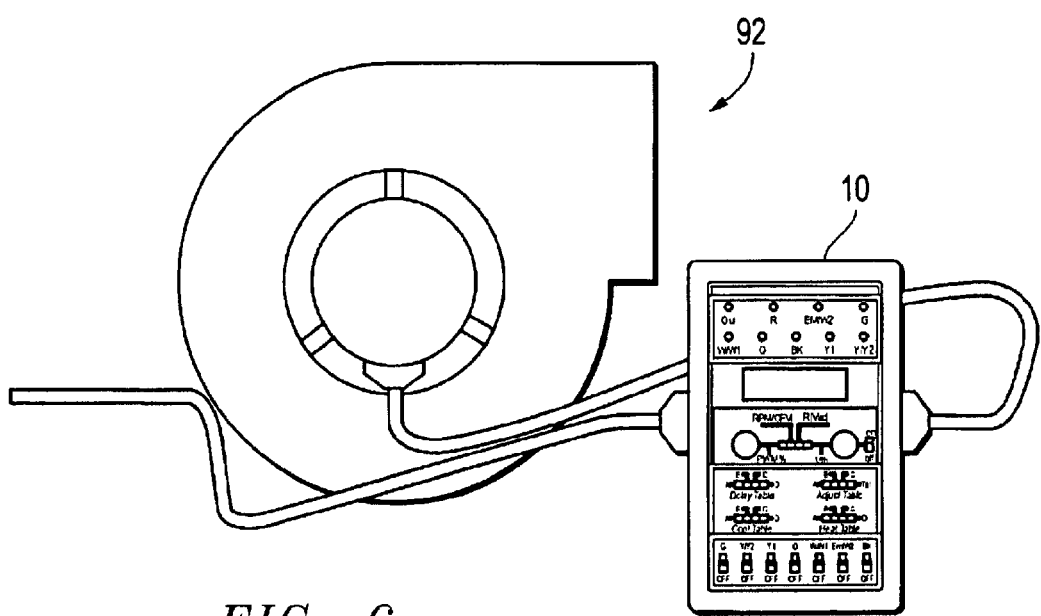
FIG. 6 is a front perspective view of the analyzer attached to the motor.

FIG. 5 is a front perspective view of the analyzer 10 attached to the air conditioning system 90. Preferably, all panels of the air conditioning system are completely closed when the analyzer is connected. Thus, accurate airflow performance, blower rpm, and motor current are measured as would be seen in normal operation of the air conditioning system. FIG. 6 is a front perspective view of the analyzer 10 attached to the motor 92.

As illustrated in FIG. 4, the air conditioning system's 90 low voltage power supply (not shown), which powers the HVAC system controls 96, energizes both the analyzer and the motor's control interface through the system connection cable. Alternatively, if the low voltage power is not available through the system connection, a separate 24VAC supply can be connected through pin-jacks "R" and "B/C." The analyzer provides a positive indication that the control voltage is present on the motor cable 102 side of the motor's connector. For example, the "R" LED only illuminates if the motor completes the low voltage (e.g., 24-Vac) control circuit. If the low voltage control circuit is open, a status lamp 50 such as the "R" Led remains off, indicating the control transformer may not be activating the air conditioning system, the motor input is damaged, or not connected. In alternate embodiments of the present invention, the status lamps may illuminate when a control circuit is open. Any visual status indicator may be utilized which provides an indication of an open or closed control circuit.

In the preferred embodiment of the present invention, when one of the status lamps 50 fails to illuminate during activation of a control signal, the motor and controls are not completing a circuit. This typically indicates a wiring error, a bad contact in the system connections, control board failure, or motor interface failure. If the technician is still unsure whether the status lamp was supposed to illuminate, or if the wrong status lamp illuminated upon activation of a control signal, the analyzer can be switched to the "Standalone" control mode by switching the control mode selector to "Analyzer." With the control mode in "Analyzer," the technician may then determine if the proper status lamp illuminates when the same control function is energized from the analyzer. By utilizing the two modes, "Analyzer" and "System," a technician can diagnose wiring faults to the source on either side of the analyzer (i.e., to the motor 92 or to the HVAC system controls 96). In addition, the display 40 may display the voltage level of the low voltage control system, RPM (if available in the motor program), percentage PWM, or Vth when the control mode selector is in either the system or analyzer control mode position.

Referring to FIGS. 1–5, with the control mode selector is in the "Analyzer" position, control signals originate within the analyzer itself. The "Analyzer" position commands a disconnect for the system control functions to the motor and connects the analyzer 10's control functions in the air conditioning system's place. In the "Analyzer" mode, the analyzer acts as a standalone control to activate the HVAC system as well as a monitor of the activation of the air conditioning system. The technician can activate the appropriate control functions from the analyzer and operate the motor through the control function activators 12. When each activator is switched from the "off" position to the "on" position, an appropriate status lamp should illuminate for a completed control circuit.

In operation, the technician may switch the control mode selector 70 between both "Analyzer" and "System" to isolate the sources of system faults to either the system side or the motor side of the air conditioning system. By alternately switching between "System" and "Analyzer" control modes, each control signal can be initiated and verified. If a status lamp fails to illuminate when a control function is activated, the troubleshooting process indicates that the motor and controls are not completing a circuit which may be caused by a wiring error, bad contact in the system connections/control board, or motor interface failure. When the technician is still not sure why a status lamp is not properly illuminated or an incorrect status lamp illuminates, the technician may operate the analyzer in the "standalone" mode ("Analyzer" control mode) to ascertain if the proper status lamp illuminates when the same function is activated through the analyzer.

Figure 7:
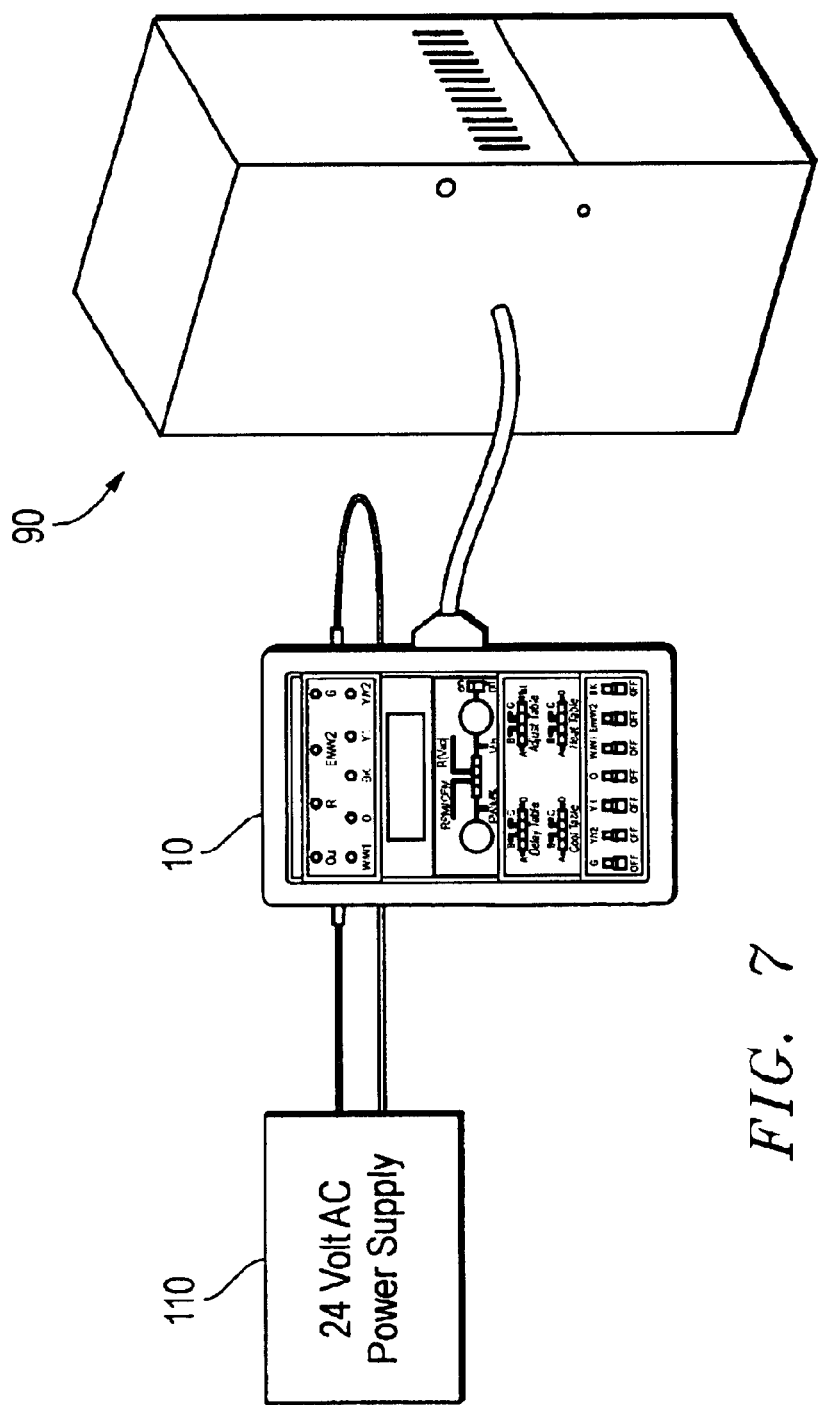
FIG. 7 is a simplified schematic block diagram of the analyzer attached to the air conditioning system in a standalone mode powered by a 24-volt AC power supply.

FIG. 7 is a simplified schematic block diagram of the analyzer 10 attached to the air conditioning system 90 in a "standalone" mode powered by a 24-volt AC power supply 110. FIG. 8 is a simplified schematic block diagram of the analyzer of FIG. 7 connected to the motor 92. In the situation when a connection through the HVAC system is not needed or accessible, the analyzer can be powered through the two power pin-jack connections 74 and 84. The pin-jack connections may be connected directly from the 24-volt power supply 110. The separate power mode may be utilized to operate the air conditioning system 90, a blower 94, or a motor 92 alone. Additionally, utilizing the analyzer from a separate power source (separate from a high voltage power source 120) provides for a particularly effective training tool for demonstrations, blower or motor verification outside of an air conditioning system, or for laboratory/developmental tests. When the analyzer is powered from the power supply 110, the control mode selector 70 must be in the "Analyzer" mode since the analyzer is not connected to any HVAC system controls 96. With the analyzer configured as illustrated and discussed in FIG. 7, the analyzer operates in the same manner as the "standalone" control mode, by providing commands directly to the motor through the analyzer.

The analyzer 10 may also be used during troubleshooting operations, as well as provide a self-contained capability to measure, test, and checkout circuit system parameters. For example, the low voltage supply may be measured on the display 40. This can be accomplished by selecting the R(Vac) position on the display mode switch 30. The analyzer may operate as a voltmeter, thus providing the technician with the versatility of the analyzer to perform multiple diagnostic functions.

In addition, the analyzer 10 may measure Y and G threshold voltage. The analyzer may test the control functions typically connected in conjunction with thermostat anticipators or control functions that can be actuated from electrical circuits that permit small currents to flow and voltages to be present even when the functions are intended to be off. These functions are typically the "Y" modes and the "Fan-only" ("G") mode. The analyzer may generate a signal to test the activation level of those functions which are "thresholded" in the motor 92. The level of voltage can then be viewed on the display 40 while the Vth control 36 is adjusted and the function is activated. It is then possible to determine the activation point of the G and Y functions.

The determination of Y and G threshold voltage is a very unique and important feature of the analyzer. Over the years, equipment manufacturers and service technicians reported a large number of assumed motor faults because the Y or G lines would not turn the motor when the lines were applied, or the motor would not turn off when the lines were removed. Upon further investigation into most of these faults, it has been determined that a large number of these diagnosed "faults" were due to erroneous voltage on the Y and G terminals, and not motor faults. In most of these situations, the high or low voltage was due to high impedance contactors or relay coils, current leaked into Y and G from certain thermostat controls, faulty or misaligned anticipators, or solid state relays. These mis-diagnosed faults resulted in time consuming service calls or expensive and unnecessary motor replacement.

A Vth threshold test performed by the technician provides a check of the voltage threshold of the preset Y and G functions in the motor. Once the motor's thresholds are verified, the technician can then proceed to determine other actual causes of the air conditioning system's malfunction. To begin the threshold test, the control mode selector 70 is set to the "Analyzer" position. The Vth switch 38 is switched to the "on" position, resulting in the disconnection of the G, Y/Y2, and Y1 functions from the power source 110. The G, Y/Y2, and Y1 functions are then connected to an internal sine-wave generator located within or in combination with the analyzer (not shown). The Vth control 36 is then actuated to adjust the voltage level. The display 40 shows the voltage level (when the display mode switch 30 is set to Vth). The Y or G control functions, during testing, should activate the motor when the Vth level is approximately fifty percent of the low voltage supply. If the adjustable level properly activates the function, the motor's internal interface is operating correctly and the motor is eliminated as the source of the system's problem. Next, the motor may then be connected back to the system controls 96 for further testing. If the motor does not activate, or activates significantly above or below fifty percent of the supply voltage level, the motor interface may be considered defective. Once the test is completed, the Vth switch 38 is returned to the "off" position so that the G and Y signals return to the air conditioning system's power supply 110.

In many situations, a technician may find it necessary to correlate airflow or sound level to blower 94 speed. The analyzer may also measure RPM from the motor's auxiliary output (not shown) to give a check of the system's performance. The RPM reading may be scaled to 12 pole brushless dc motors delivering 36 pulses per revolution (60 pulses per second per 100 RPM), in a similar fashion as most conventional air conditioning motors normally operate. In alternate embodiments of the present invention, scaling of motors having different numbers of poles and pulses per revolution may be utilized.

The motor typically sends pulses whenever the motor is powered. These indicator pulses appear as approximately 150 RPM on the analyzer's display 40. When G, Y and all other command functions are off, the presence of approximately 150 RPM on the display indicates that the motor is powered and properly sending the pulses.

The analyzer also includes an internal PWM generator for use in troubleshooting the air conditioning system 90. The PWM generator is particular effective for those air conditioning systems in which the percent duty cycle of a fixed period pulse rate is used to set airflow, mass flow, or to control motor torque (e.g., variable-speed systems). To operate the internal PWM generator, the BK/PWM switch 82 must be set to the PWM setting, resulting in the generation of an internal PWM signal which can be supplied to the motor through the "BK" activator 12. If the motor is programmed to accept a duty cycle input, the motor responds to the PWM signal by changing airflow and/or torque level to settle at a speed appropriate for the blower in which it is used. The analyzer may also utilize the internal PWM generator for systems whose normal operation uses fixed or discrete settings, rather than or in addition to continuously variable settings. The technician can them use airflow adjustments to determine duct or filter restriction to the air conditioning system, noise level at various airflow settings, power consumption comparisons, etc. After such evaluation and determination, the technician can then establish and return to fixed settings to reduce or accommodate the problems of the air conditioning system.

The analyzer 10 may also measure the duty cycle used to command blower airflow of the air conditioning system's 90 generator or the analyzer's own internal generator. When the control mode selector is set to the "System" position and a PWM sign is present, the system's PWM percentage duty cycled maybe measured and displayed. The analyzer may also measure the internally-generated PWM signal and display it on the display 40 by selecting the "Analyzer" position on the control mode selector 70.

In addition, by activating the verify commons switch 80, the analyzer provides a comparison of system operation with and without an assured connection between "C1" and "C2" in the motor connector. The C1 and C2 connections are two electrical common or "ground" connections which may be required in the proper operation of the motor's command functions.

In alternate embodiments of the present invention, the analyzer may take several different forms. For example, the general configuration may be configured differently from that illustrated in FIGS. 1–8. However, it should be understood that the analyzer may be any device which provides a portable control apparatus having a plurality of independent diagnostic and control tools to troubleshoot an HVAC system.

The analyzer 10 provides many advantages over existing diagnostic devices. The analyzer provides a plurality of diagnostic measurement devices allowing a technician to determine the parameters of the air conditioning system. In addition, the analyzer provides a dual mode operation, a "standalone" control system and an "in-line" control system. The "standalone" control system provides solely for independent control of the air conditioning system, while the "in-line" control system enables a technician to both independently control the system and to monitor the system's control parameters of the air conditioning system's internal controls as it controls the system. The analyzer also allows the technician to obtain various measures through the control of the motor, thereby providing another avenue to determine the source of the air conditioning system's problems.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A diagnostic apparatus for examining a heating, ventilation, and air conditioning (HVAC) system having an internal controller sending control signals to an electronically-driven motor of the HVAC system, said apparatus comprising:

a control unit detachably connected to the HVAC system, said control unit controlling a plurality of control parameters associated with the electronically-driven motor of the HVAC system; and means for said control unit to monitor a plurality of performance characteristics associated with the electronically-driven motor of the HVAC system;

means for said control unit to monitor the control signals of the HVAC System's internal controller;

whereby said control unit monitors the plurality of performance characteristics while controlling the HVAC system to provide a diagnostic check of the HVAC system.

2. The diagnostic apparatus of claim 1 wherein said control unit controls a plurality of control parameters through a plurality of control function activators providing control functions to the electronically-driven motor of the HVAC system.

3. The diagnostic apparatus of claim 2 wherein said control function activators provide control functions directly to the HVAC system.

4. The diagnostic apparatus of claim 1 wherein said control unit controls a plurality of control parameters as a control system separate from internal controls of the HVAC system, wherein said control unit controls the plurality of control parameters upon activation of a single switch, thereby isolating the HVAC System's internal controls from the electronically-driven motor.

5. The diagnostic apparatus of claim 1 wherein said control unit includes a visual indication of at least one properly functioning control circuit associated with at least one of the plurality of control parameters of the HVAC system.

6. The diagnostic apparatus of claim 1 wherein said control unit includes means for variably adjusting and thereby controlling at least one control parameter of the HVAC system over a continuous range of operation.

7. The diagnostic apparatus of claim 6 wherein said variable control means is a pulse width adjuster to test and verify operation of control parameters that respond to a duty cycle.

8. The diagnostic apparatus of claim 6 wherein said variable control means is a variable voltage threshold (Vth) function adjuster.

9. The diagnostic apparatus of claim 1 wherein said means for said control unit to monitor a plurality of performance characteristics of the HVAC system includes a display providing a graphical representation of at least one performance characteristic.

10. The diagnostic apparatus of claim 1 wherein said control unit is powered from a power source separate from any power source powering the HVAC system.

11. The diagnostic apparatus of claim 1 wherein said control unit is powered by the same power source powering the HVAC system.

12. The diagnostic apparatus of claim 1 wherein said control unit connected to the HVAC system with a first cable extending from said control unit to a control system of the HVAC system and a second cable connecting said control unit to a the electronically-driven motor driving the HVAC system.

13. The diagnostic apparatus of claim 1 wherein said monitoring means of a plurality of performance characteristics includes monitoring a voltage associated with the HVAC system.

14. The diagnostic apparatus of claim 1 wherein said monitoring means of a plurality of performance characteristics includes monitoring a revolution per minute count of the electronically-driven-motor operating the HVAC system, wherein the performance characteristics include the current operating speed of the electronically-driven motor.

15. The diagnostic apparatus of claim 1 wherein said monitoring means of a plurality of performance characteristics includes monitoring a Y and G threshold voltages, the Y and G threshold voltages providing activation threshold voltages for operating a motor associated with the HVAC system.

16. The diagnostic apparatus of claim 1 wherein said control unit includes a PWM duty cycle generator to test and verify operation of motors or other control actuators that respond to a duty cycle.

17. The diagnostic apparatus of claim 1 wherein:
the HVAC system includes a control system controlling a motor within the HVAC system; and
said control unit includes a selectable switch, said switch allowing said control unit to operate in a first mode to monitor a plurality of interconnected functions between the HVAC system and the motor and a second mode to disconnect the control system from operating and controlling the motor;
whereby switching between the first mode and the second mode provides means for isolating a location of a malfunction occurring within the HVAC system.

18. An apparatus for examining a heating, ventilation, and air conditioning (HVAC) system having an internal controller sending control signals to an electronically-driven motor of the HVAC system, said apparatus comprising:
a portable control unit detachably coupled to the HVAC system, said control unit monitoring a plurality of performance characteristics associated with a plurality of control parameters controlling the electronically-driven motor of the HVAC system and monitoring the control signals of the internal controller; and
means for controlling the electronically-driven motor of the HVAC system within the portable control unit through the plurality of control parameters of the HVAC system;
whereby said control unit monitors the plurality of performance characteristics while controlling the electronically-driven motor of the HVAC system to determine a status of the HVAC system.

19. A diagnostic apparatus for examination of a heating, ventilation, and air conditioning (HVAC) system having an internal controller sending control signals to an electronically-driven motor of the HVAC system, said apparatus comprising:
a control unit having connecting means to the HVAC system, said control unit controlling a plurality of control parameters of the electronically-driven motor of the HVAC system through a plurality of control function activators providing control functions to the HVAC system, said control unit variably controlling at least one control parameter; and
means for said control unit to monitor a plurality of performance characteristics of the electronically-driven motor of the HVAC system;
means for said control unit to monitor the control signals of the internal controller;
whereby said control unit monitors the plurality of performance characteristics while controlling the HVAC system to provide a diagnostic check of the HVAC system.

* * * * *